US005182929A

United States Patent [19]

Myers

[11] Patent Number: 5,182,929

[45] Date of Patent: Feb. 2, 1993

[54] METHOD OF PROVIDING A UNIVERSAL KEYWAY LOCK AND PLUG THEREFOR

[75] Inventor: Gary L. Myers, River Grove, Ill.

[73] Assignee: Fort Lock Corporation, River Grove, Ill.

[21] Appl. No.: 361,333

[22] Filed: Jun. 5, 1989

[51] Int. Cl.[5] .......... G05B 35/08

[52] U.S. Cl. .......... 70/337; 70/340; 70/492; 70/406

[58] Field of Search .......... 70/356, 490–492, 70/367–371, 406, 337–340

[56] References Cited

U.S. PATENT DOCUMENTS

| | | | |
|---|---|---|---|
| 1,860,708 | 5/1932 | Falk | 70/340 X |
| 1,958,603 | 5/1934 | Bacon | 70/406 |
| 2,182,809 | 12/1939 | Johnstone | 70/492 |
| 2,766,611 | 10/1956 | Hagel | 70/492 |
| 3,137,156 | 6/1964 | Navarro | 70/492 |
| 3,499,304 | 3/1970 | Naujoks | 70/406 |
| 3,555,859 | 1/1971 | Berkowitz | 70/340 |
| 3,881,333 | 5/1975 | Christmas | 70/490 X |
| 4,075,879 | 2/1978 | Christopher | 70/337 |
| 4,302,957 | 12/1981 | Wolter | 70/337 |
| 4,440,009 | 4/1984 | Smith | 70/340 X |

*Primary Examiner*—Rodney M. Lindsey
*Assistant Examiner*—Suzanne L. Dino
*Attorney, Agent, or Firm*—Leydig, Voit & Mayer

[57] ABSTRACT

A method and replacement plug for cylinder locks converts locks having special keyways requiring correspondingly warded key blanks into a universal keyway lock that can be properly operated by a multiplicity of differently warded keys.

5 Claims, 1 Drawing Sheet

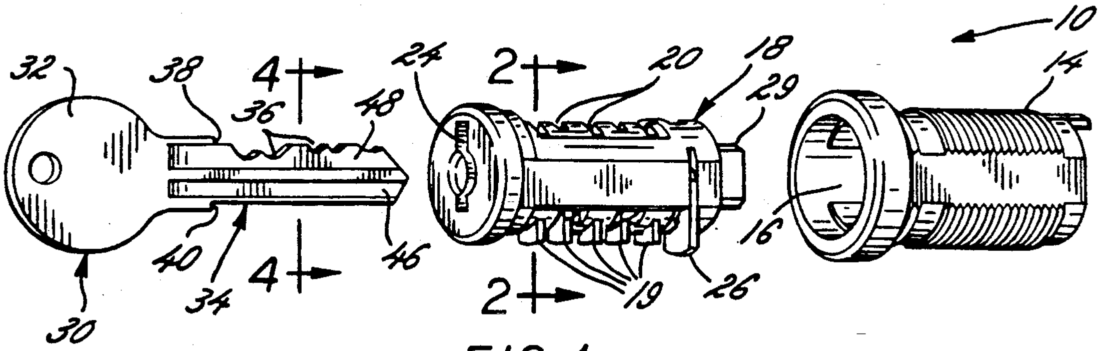
FIG. 1
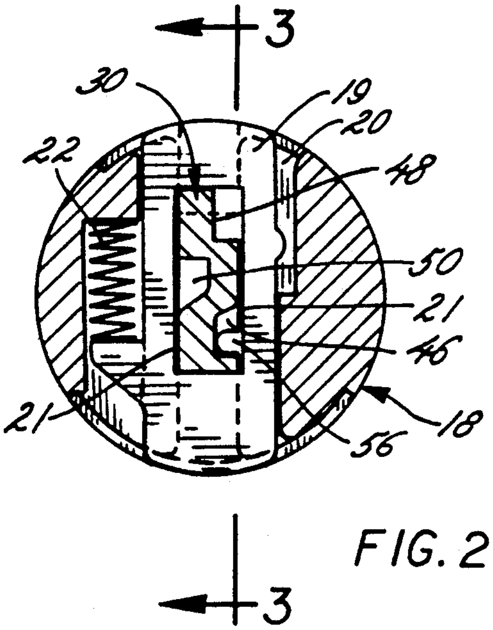
FIG. 2
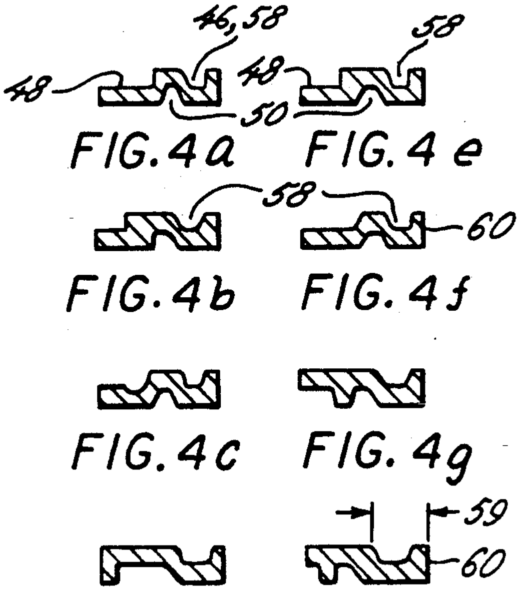
FIG. 4a FIG. 4e
FIG. 4b FIG. 4f
FIG. 4c FIG. 4g
FIG. 4d FIG. 4h
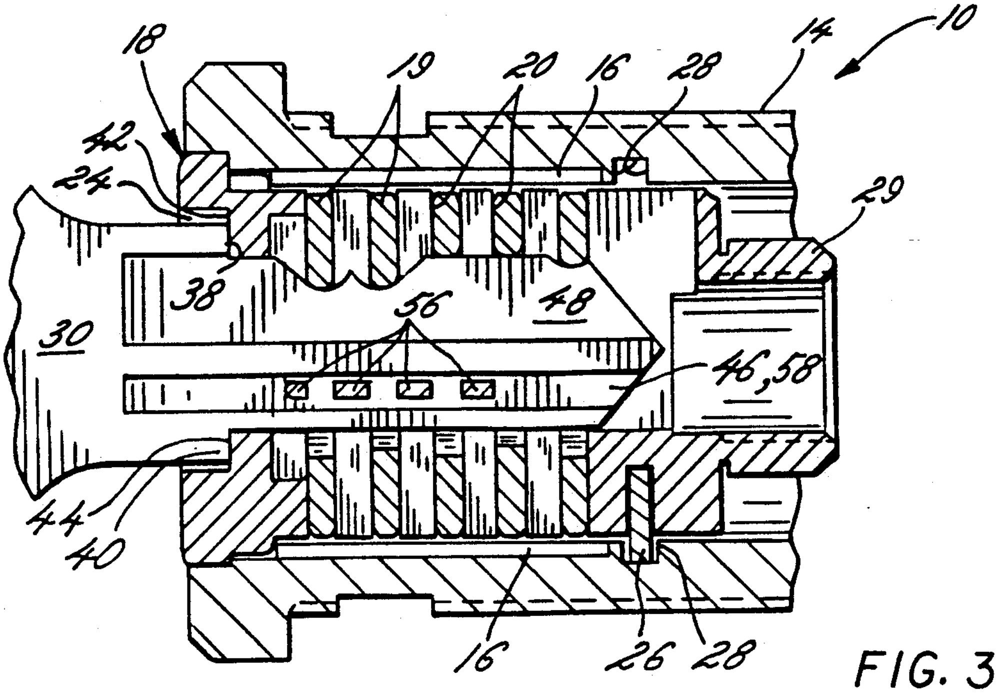
FIG. 3

METHOD OF PROVIDING A UNIVERSAL KEYWAY LOCK AND PLUG THEREFOR

FIELD OF THE INVENTION

The present invention relates generally to cylinder locks of the type which have employed keyways adapted to receive specially warded key blanks that are bitted to fit a particular lock.

BACKGROUND OF THE INVENTION

Among the most commonly used types of cylinder locks are those which employ a rotatable plug with a generally longitudinal keyway that receives a flat elongated properly bitted key. Typically the plug is mounted in a cylindrical shell that has at least one longitudinal groove in its internal periphery and the plug carries combinated tumblers, which may be discs or pins that are normally biased to prevent rotation of the plug when the combinating tumblers extend into the shell groove. Insertion of a properly bitted key in the keyway aligns the combinated tumblers with a shear position allowing the plug to rotate in respect to the shell.

Due to the fact that numerous lock manufacturers offer these types of locks which constitute the highest volume ones demanded and lowest cost ones, such as a five disc tumbler lock, each manufacturer attempts to provide a key blank specific to its own produced locks by using special wardings on the key that match its plug keyway employing differently located longitudinal ribs. Since there are so many different key blank configurations, locksmiths, hardware stores and the like who cut keys need to maintain large stocks of the different key blanks in order to cut new or additional keys. For many years now, removable and replaceable plugs have been utilized such as, for example, those of Shinn U.S. Pat. No. 1,805,891 and Falk U.S. Pat. Nos. 1,990,934 and 2,061,456. Although, this approach of plug replacement has provided an alternative to substituting a different key blank when the original is not available, it has not provided a satisfactory solution to the problem of still needing to stock numerous different ones of the key blank configurations.

OBJECTS AND SUMMARY OF THE INVENTION

The general aim of the present invention is to provide a method of adaptation of cylindrical plug locks to employ a universal keyway that will accommodate a multiplicity of differently warded key blanks so as to minimize a need for large stocking of different key blanks at key cutting locations.

More specifically, it is an object of the invention to provide a cylinder lock plug construction wherein the keyway is universally set up to receive and handle a vast array of key blank wardings while still providing proper key support within the lock and the same ease of operation of the rotatable plug as with a special fitted key.

These and other advantages of the invention will be more apparent from the following detailed description when taken in conjunction with the accompanying drawings.

BRIEF DESCRIPTION OF THE DRAWINGS

FIG. 1 is an exploded perspective view of a key, plug and lock cylinder of the type used with and embodying the present invention;

FIG. 2 is a vertical cross-sectional view of the assembled lock construction of FIG. 1;

FIG. 3 is a sectional view taken along the line of 3—3 of FIG. 2; and FIGS. 4*a–b* are a grouping of illustrations of a variety of blank key sections showing examples of different wardings as utilized for disc tumbler locks.

DETAILED DESCRIPTION OF THE PREFERRED EMBODIMENTS

Turning to the drawings, there is illustrated in FIG. 1, a disc tumbler cylindrical lock arrangement generally referred to by the reference character 10, and, for illustrative purposes, the arrangement is shown in exploded form to identify each of its components.

The lock arrangement 10 includes a generally cylindrical housing or shell 14 which on its internal periphery has a longitudinally extending groove 16. The shell receives a plug 18 which carries a set of combinating tumblers 19 that are fixedly held in the plug slots 20 and include springs 22 which normally bias the tumblers outwardly with respect to the plug. Each of the tumblers 19 has a slot 21 intermediate its ends which is disposed in the central keyway slot 24 of the plug. The plug also carries a removal tumbler 26 that engages with a transverse peripheral groove 28 in the shell serving to hold the plug fixedly in the shell. As is well known to those skilled in the art, the removal tumbler 26 may be actuated by a control key or by a pick like device to remove the plug from the shell. In the present instance, at the rear of the plug 18 there is a projecting square portion 29 which serves to receive a cam or the like (not shown) that would be operated by the rotation of the plug such as used for cabinet or drawer locking.

As further illustrated in FIG. 1, a typical key 30 has an enlarged manual operating end 32 and the elongated flat rectangular end 34 which is properly bitted 36 and enters the keyway slot 24 in the plug 18 to actuate the tumblers 19 so as to align them with the shear position between the outer peripheral surface of the plug and the inner peripheral surface of the shell. When the tumblers 19 are moved to the shear position by the properly bitted key, the plug 18 is freely rotatable within the shell 14.

Turning to FIG. 2, the key is illustrated in the lock insertion position with the tumblers 19 actuated and positioned at the shear location. The particular key 30 illustrated, it will be noted, has upper and lower projecting portions 38, 40 which co-act as stops with flat portions 42, 44 in the keyway 24 so as to define the limit of the longitudinal insertion of the key and align the combinated bittings on the key with the particular tumblers. The particular key 30 shown also includes a pair of longitudinally extending wards 46, 48 on the side of the key shown and there is likewise a ward 50 on the other side of the key which gives the key a specific cross-sectional configuration.

Referring to FIG. 4, there are shown a grouping of illustrations of a variety of key blank sections which exemplify some of the different wardings utilized for disc tumbler key blanks as well as the different key shapes. Various manufacturers utilizing any of the different exemplary warded key blanks as well as others also include in the keyway corresponding longitudinal ribs that engage with the key wards. The number and placement of such ribs in the keyway of the plug gives the keyway a specific peripheral and cross-sectional configuration that will accept essentially only the correspondingly shaped key, and serves to reject or not accept a key with a different ward configuration.

In accordance with the present invention, a replacement plug with removable tumbler means is provided that includes a substantially unrestricted rectangular keyway slot such that the plug will receive a considerable number of different warded key configurations. In order, however, to properly support, guide and position each of the varying cross-sectionally shaped keys in the plug such that the same bittings on the different keys will still align the tumblers at the shear position and permit the plug to be easily rotated by the key, only one longitudinally extending rib 56 is included in the plug keyway. This rib 56 is sized and set up with its position being predeterminedly selected to be located at a common denominator location for all of the various differently warded key blanks which are to be made operable with the replacement plug. Here, the common denominator key ward location for each of eight illustrative key blanks appears on the right side of the key cross-sections as shown in FIG. 4 and indicated at 58. FIG. **4*h* illustrates a control area 59 which is defined as the distance from the floor 60 of the key up to, and including, the common denominator key ward 58 so that longitudinal key rib 56 can fit within the control area 59 when the key slot 24 receives the key 30. The control area 59 determines the position of the common denominator key rib 56** so that it accepts keys with different warded key configurations having a common denominator key ward.

Referring to FIG. 3, the substantially unrestricted keyway 24 of the plug has the one longitudinally extending rib 56 sized and positioned so as to engage with the one ward 58 of each of the selected key blank wards and all of the different keys will be properly guided, supported and positioned in the same plug 18 so as to enable its tumblers 19 to operate within the lock shell 14.

I claim as my invention:

1. A method of adapting a cylindrical lock employing a rotatable plug with a longitudinally extending rectangular key slot for universally receiving keys having a control area and a multiplicity of different warding including the steps of a) providing a tumbler carrying plug with a substantially unrestricted keyway slot adapted to receive properly bitted keys of each of said different ward configurations, b) incorporating in said keyway only one longitudinal rib predeterminedly located to receive the control area of the key and to be at a common denominator location for each of the multiplicity of warded key blanks and to provide guidance and support for all of the multiplicity of keys in the plug keyway slot, and c) adapting said substantially unrestricted slot plug for replacing a lock plug having a specific keyway slot for a specially warded key configuration.

2. A rotatable plug for a cylindrical lock having a plurality of combined tumblers, a plug removal means and a longitudinally extending key slot for receiving a properly bitted flat combinated key comprising, means defining a substantially unrestricted rectangular keyway slot in the plug adapted to receive a multiplicity of keys having different ward configurations, and said keyway slot including only one longitudinal rib predeterminedly located to receive a control area of the key and to be at a common denominator location for each of said multiplicity of warded key blanks so as to provide guidance, support and operation of the tumblers by all of the multiplicity keys in the plug keyway slot.

3. A rotatable plug for a cylinder lock as claimed in claim 2 wherein said plug includes five disc tumblers and a plug removal tumbler.

4. A rotatable plug as claimed in claim 2 wherein said means defining the keyway slot is adapted to receive a multiplicity of warded keys having on the order of eight varying ward configurations.

5. A rotatable plug for a cylindrical lock, comprising:

a plug body including a plurality of combinated tumblers, plug removal means and a longitudinally extending key slot for receiving a properly bitted flat combinated key;

means defining a substantially unrestricted rectangular keyway slot in the plug for receiving a multiplicity of keys having different ward configurations; and said keyway slot including means defining one longitudinal rib predeterminedly located to receive a control area of the key and to be at a common denominator location for guiding and supporting each of said multiplicity of warded key blanks for operation of the tumblers by each one of the multiplicity of keys when inserted in the plug keyway slot.

* * * * *